No. 732,895.

Patented July 7, 1903.

UNITED STATES PATENT OFFICE.

SAMUEL S. RUSTON AND BENJAMIN RUSTON, OF SYRACUSE, NEW YORK.

WATER-PAINT AND METHOD OF PRODUCING SAME.

SPECIFICATION forming part of Letters Patent No. 732,895, dated July 7, 1903.

Application filed August 2, 1902. Serial No. 118,087. (No specimens.)

*To all whom it may concern:*

Be it known that we, SAMUEL S. RUSTON and BENJAMIN RUSTON, of Syracuse, in the county of Onondaga, in the State of New York, have invented new and useful Improvements in Water-Paints and Method of Producing Them, of which the following is a full, clear, and exact description.

This invention relates to water-paints and method of producing them.

Our object is to produce a water-paint by a combination of ingredients which shall render it cheap and durable and of great utility.

Our invention consists in a waterproof paint composed of the several ingredients hereinafter specified thoroughly mixed and commingled together by a process and method hereinafter set forth; and to that end our invention consists in combining the several ingredients hereinafter specified and in the several new and novel steps constituting the process by which such waterproof paint is prepared, all of which are thoroughly set forth in the claims hereunto annexed.

We dave discovered that by combining common cheese-curd, either wet or dry, with resin in its finely-divided state such composition when mixed with an alkali solvent and then again mixed with water produces a tough waterproof film. We mix this composition with lime slaked with a solution of alumina sulfate and have as a result a composition which when mixed with a given quantity of water forms on drying a waterproof paint or adhesive mixture which is adapted for sizing, wall-coating, &c.

The following are substantially the proportions used to produce our composition, although we do not limit ourselves to these exact amounts, as they may be varied according to the use to which the composition is to be put. Ordinarily, however, we combine fifty per cent. of casein with an equal amount of resinous substances. The solution used to slake the lime with alumina sulfate comprises about ninety per cent. of lime and ten per cent. of alumina sulfate with the usual amount of water—that is, sufficient water to completely hydrate the CaO. These freshly-precipitated bodies render the resinous substances present with the casein quite insoluble when dried.

The following is the formula of the reaction of the alumina sulfate and lime composition:

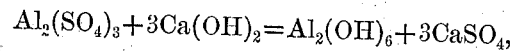
$$Al_2(SO_4)_3 + 3Ca(OH)_2 = Al_2(OH)_6 + 3CaSO_4,$$

but under no circumstances must sufficient alumina sulfate be used to convert all the calcium hydroxid into sulfate.

In carrying out this process we make the following steps: We first prepare an emulsion of resin or saponify the same with an alkali, such as carbonate of soda or caustic soda, employing from fifteen to twenty-five per cent. of such alkali to the amount of resin. We then add this to skimmed milk and heat to from 110° to 130° Fahrenheit and then add an acid, such as sulfuric acid. The acid neutralizes the alkali and deposits the resin or its acid in the minutely-subdivided state, after which the curd and whey are separated, and after drying off the latter the mass of composition is then washed and dried. The curd compound thus obtained is further compounded with a solvent, such as an alkali or alkaline earths, which are dried or mixed with a suitable salt, the salt forming the property to fix the curd and resinous matter in the final drying in the paint or wall-sizing. We have found that this is satisfactorily accomplished by the use of alumina sulfate. We therefore combine burned lime (or alumina) with alumina sulfate, and to accomplish this we first slake the lime by adding a solution of alumina sulfate thereto. The chemical action takes place, and the ingredients are then brought together, and the lime compound is thus made a fixing agent for the resinous matter or salts in combination with the curd, the two mixtures in the final product being in about equal proportions. This composition may also be mixed with mineral matter, metallic oxid, coloring, &c. These ingredients are then dried, finely ground, and when mixed with water produce a superior and adhesive size or wall-coating or paint.

Having described our invention, what we claim, and desire to secure by Letters Patent, is—

1. The herein-described composition consisting of milk albuminoids, resinous substances, lime and alumina hydroxid and calcium sulfate.

2. The herein-described composition consisting of milk albuminoids, resinous substances, lime, alumina hydroxid, calcium sulfate, and a filler of mineral matter in a finely-divided state.

3. The herein-described process of producing paints consisting of the following steps: first—in emulsifying the resin, mixing it with skimmed milk, adding an acid to precipitate the milk and resin, separating the whey from the curd compound, then washing, drying and pulverizing this compound, then mixing with a lime compound obtained by slaking the lime with a solution of alumina sulfate.

4. The herein-described process of producing paints consisting of the following steps: first—in emulsifying the resin, mixing it with skimmed milk, adding an acid to precipitate the milk and resin, separating the whey from the curd compound, then washing, drying and pulverizing this compound, then mixing with a lime compound obtained by slaking the lime with a solution of alumina sulfate and mineral matter in its finely-divided state.

In witness whereof we have hereunto set our hands this 29th day of July, 1902.

SAMUEL S. RUSTON.
BENJAMIN RUSTON.

Witnesses:
MILDRED M. NOTT,
HOWARD P. DENISON.